(12) United States Patent
Vedula

(10) Patent No.: US 7,996,237 B2
(45) Date of Patent: Aug. 9, 2011

(54) PROVIDING COLLABORATION SERVICES TO BUSINESS APPLICATIONS TO CORRELATE USER COLLABORATION WITH THE BUSINESS APPLICATION

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1039 days.

(21) Appl. No.: 11/772,254

(22) Filed: Jul. 2, 2007

(65) Prior Publication Data

US 2008/0281608 A1 Nov. 13, 2008

(30) Foreign Application Priority Data

May 9, 2007 (IN) .............................. 983/CHE/2007

(51) Int. Cl.
*G06Q 10/00* (2006.01)
(52) U.S. Cl. ........ 705/1.1; 709/204; 709/206; 705/7.11; 705/30
(58) Field of Classification Search .................... 705/1.1, 705/7.11, 30; 709/204, 206
See application file for complete search history.

(56) References Cited

U.S. PATENT DOCUMENTS

| 6,999,990 B1 * | 2/2006 | Sullivan et al. ............... 709/205 |
| 7,000,179 B2 * | 2/2006 | Yankovich et al. ........... 715/222 |
| 7,050,986 B1 * | 5/2006 | Vance et al. ..................... 705/5 |
| 7,792,773 B2 * | 9/2010 | McCord et al. ................. 706/47 |
| 2001/0037363 A1 * | 11/2001 | Battilega et al. ............. 709/204 |
| 2005/0246274 A1 * | 11/2005 | Abbott et al. .................... 705/40 |
| 2006/0106847 A1 * | 5/2006 | Eckardt et al. ................ 707/101 |
| 2007/0033088 A1 * | 2/2007 | Aigner et al. ..................... 705/9 |

* cited by examiner

*Primary Examiner* — Jami A Plucinski
*Assistant Examiner* — Sangeeta Bahl
(74) *Attorney, Agent, or Firm* — Narendra Reddy Thappeta

(57) ABSTRACT

An aspect of the present invention provides collaboration services to business applications and such a service is provided by a mediator and a collaboration application. The collaboration service offers a user of the business application the ability to collaborate with other users of the business application or one or more responders such that any collaboration that occurs between the user and the responder is correlated to the business application and to the corresponding actions performed by the user with respect to the business application, thus maintaining the context of the collaboration. Another aspect of the present invention provides a collaboration service wherein the user of the business application is provided with at least part of a history of collaboration that occurred between the user and one or more responders.

30 Claims, 16 Drawing Sheets

| 330A | 330B | 330C | 330D | 330E |
|---|---|---|---|---|
| Name of user | Page/ section Name | Business Application Name | Collaboration information on responder | Collaboration data ID |

*FIG. 3A*

| 342 | 344 | 345 | 346 | 348 |
|---|---|---|---|---|
| John.doe@ acme.com | Create Expense Report | Oracle Internet Expenses | Mary.beth@ acme.com | imap:// acme.com/ john.doe/ uid=10 |
| Mary.beth@ acme.com | Create Expense Report | Oracle Internet Expenses | John.doe@ acme.com | imap:// acme.com/ john.doe/ uid=20 |

*FIG. 3B* http://iexpense.acme.com/login

Oracle Internet Expenses

Login

User Name | john.doe@acme.com

Password | ********

Link 1 - imap://acme.com/john.doe/uid=10 462
From: john.doe@acme.com
To: mary.beth@acme.com
Cc: mediator@acme.com
Date:
Subject: Expense report query Hi Mary,
You are my default-approving manager for all expenses, but would you also be approving my onsite expenses or my onsite manager?
John.

Link 2 - imap://acme.com/mary.beth/uid=20 464
From: mary.beth@acme.com
To: john.doe@acme.com
Cc: mediator@acme.com
Date:
Subject: Re: Expense report query Hi John,
Please select your onsite manager as the overriding approver for this expense.
Mary

*FIG. 4G*

PROVIDING COLLABORATION SERVICES TO BUSINESS APPLICATIONS TO CORRELATE USER COLLABORATION WITH THE BUSINESS APPLICATION

RELATED APPLICATION

The present application is related to and claims priority from the co-pending India Patent Application entitled, "PROVIDING COLLABORATION SERVICES TO BUSINESS APPLICATIONS TO CORRELATE USER COLLABORATION WITH THE BUSINESS APPLICATION", Serial Number: 983/CHE/2007, Filed: May 9, 2007, naming the same inventors as in the subject patent application, and is incorporated in its entirety herewith.

BACKGROUND

1. Technical Field

The present invention generally relates to collaboration services, and more specifically to various collaboration services offered to users of business applications.

2. Related Art

Collaboration services enable users of different computer systems to collaborate (communicate) with each other to seek solutions to problems and share information by various collaborative tools such as email, instant messaging, file sharing, web conferencing, etc. Users of business applications such as Customer Relationship Management, Enterprise, Resource Management, etc use these collaborative tools to communicate with other users of the business application.

A user of a business application may typically perform certain actions with respect to the business application, such as selecting an item from a set of items, completing a form, etc. While performing these actions with respect to the business application the user may often need to communicate with other users of the business application or one or more suitable responders who can respond to any queries the user may have in order to complete the actions. In such case the user may use one of the collaborative tools such as an email, to communicate, and reproduce the relevant business application information, such as the corresponding actions performed by the user with respect to the business application, in the email to set a context for the communication. The user sends such email and receives a response from one or more responders and any other subsequent email messages sent and received for the above context. All such email messages are stored along with the multitude of email messages typically in the user's message box.

One disadvantage with this approach of communication between users of the business application is that for any future reference to the email messages sent and received with respect to the above context, the user may have to spend considerable time searching through the entire message box and correlating the email to the business application and the corresponding actions performed with respect to the business application. This may also discourage the user from re-using the information exchanged in these emails.

Thus there is need for techniques that enable communication between users of business application and reduce and/or eliminate the above-described disadvantages.

BRIEF DESCRIPTION OF THE DRAWINGS

Embodiments of the present invention will be described with reference to the accompanying drawings briefly described below.

FIG. 3A illustrates the type of data stored in the mediator according to an embodiment of the present invention and FIG. 3B illustrates an instance of the data type stored in the mediator according to an example embodiment of the present invention.

FIGS. 4A to 4G are exemplary snapshots of the pages, such as a web page of a business application illustrating several embodiments of the present invention.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

Overview

Figure 1:
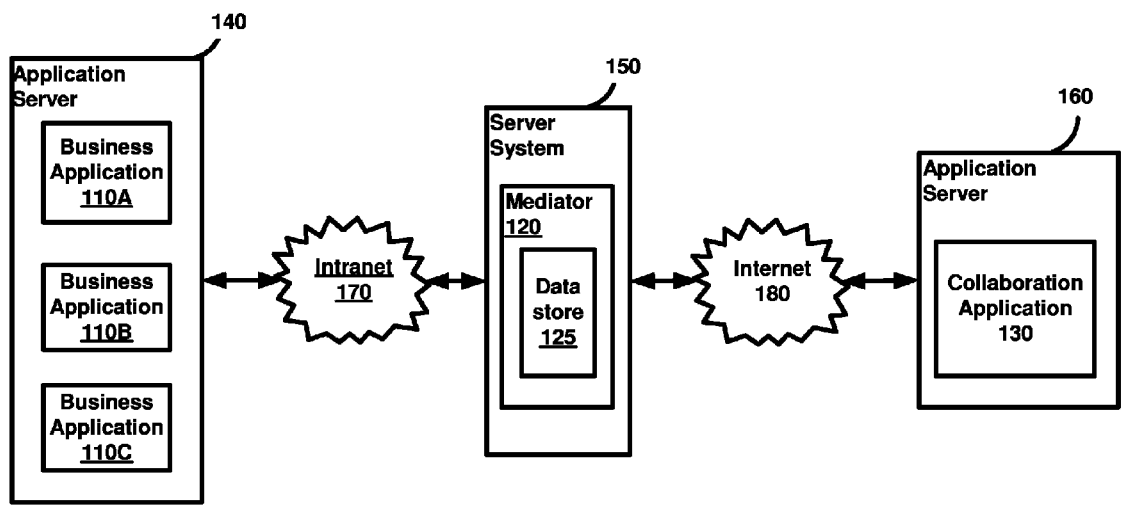
FIG. 1 is a block diagram illustrating the various components operating in the system of an embodiment of the present invention.

Some embodiments of the present invention provide collaboration services to business applications such that any collaboration that occurs between a user of one or more business applications and one or more responders is correlated to the business application(s) and to the corresponding actions performed by the user with respect to the business application(s), thus maintaining the context of the collaboration. Optionally, some embodiments of the present invention provide a collaboration service wherein the user of a business application is provided with at least part of a history of collaboration that occurred between the user and one or more responders.

An aspect of the present invention provides collaboration services to business applications and such a service is provided by a mediator and a collaboration application, wherein the mediator is a computer-based system that is capable of mediating communication between two or more computer-implemented processes such as between the business application and the collaboration application. The collaboration service offers a user of the business application the ability to collaborate with other users of the business application or one or more responders such that any collaboration that occurs between the user and the responder is correlated to the business application and to the corresponding actions performed by the user with respect to the business application, thus maintaining the context of the collaboration.

Another aspect of the present invention provides a collaboration service wherein the user of the business application is provided with at least part of a history of collaboration that occurred between the user and one or more responders.

One more aspect of the present invention provides a mediator that mediates communication between the business application and the collaboration application in order to provide collaboration services. The mediator receives context information generated by the business application, such context information, may include information that represents the actions performed by the user with respect to the business application and the corresponding state of the business application and a responder suitable for responding to any queries related to any such action. Based on the context information the mediator queries the collaboration application for collaboration information, such collaboration information may include information on a current or mode of communication with one or more responders, such as email, voice, text messaging, paging, annotations in a document, pop-ups, a message in a Web page, or instant messaging, etc. Based on the collaboration information the mediator generates a collaboration link, such as a hyperlink that opens and redirects the user to a communication client such as an email client or chat client in order to facilitate communication with one or more responders.

The mediator may send this collaboration link to the business application that incorporates the link on the page/section of the business application (referred to as current section) that generated the context information.

According to another aspect of the present invention, the mediator mediates communication between the user of the business application and one or more responders to provide the user a history of collaboration that occurred between the user and the responder. In an embodiment the mediator participates in the communication between the user and one or more responders (referred to as collaboration session) and stores an identifier (ID) corresponding to the communication content such as the email message (hereafter, referred to as collaboration data). The mediator generates a collaboration history link, such as a hyperlink that redirects the user of the business application to a page, such as a web page, that includes at least part of the history of communication between the user and one or more responders The mediator sends this collaboration history link to the business application that incorporates the link on the current section of the business application Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. EXAMPLE ENVIRONMENT

Some or all of the Figures below have been explained with reference to an example application when required, such as the Oracle® Internet Expense application, a travel and expense solution for expense reimbursement from Oracle Corporation of Redwood Shores, Calif. An employee or a user of this application may use this application for submitting expenses online for approval and subsequent reimbursement. In a scenario of the example embodiment, the user has to navigate through all the pages of the application and fill in the relevant sections to finally submit the expense for approvals. The expenses may be approved by the user's approving manager or any other overriding approver as set by the user in the create expense report section of the application.

FIG. 1 is a block diagram illustrating the various components operating in the system of an embodiment of the present invention. The diagram is shown containing business applications 110A-110C running on one or more application servers 140, mediator 120 with its data store 125 running on a server system 150 and a collaboration application 130 running on one or more application servers 160. The one or more business applications, for example, 110A-110C and mediator 120 are coupled together by a network 170 (an intra network or inter network such as the Internet or a combination thereof), and the mediator 120 and the collaboration application 130 are coupled together by a network 180 (an intra network or inter network such as the Internet or a combination thereof). Each element of the system is described in further detail below.

While network 170, network 180, application server 140, server system 150, and application server 160 are shown as separate in FIG. 1, in other embodiments they may be combined together in various combinations. For example, networks 170 and 180 may be the same network. In another example the Business Applications (e.g., 110A-C), Mediator 120, and Collaboration Application 130 can be on one server or distributed over a combination of servers.

Business applications 110A-110C refer to a computer-based system implementing a business process or a business function and processing business information in order to achieve the objectives of the business function. To a user, business application 110A-110C typically offers several web pages or client pages; the user navigates through the pages, and performs certain actions with respect to each page such as selecting an item from a set of items, completing a form, proceeding to next section, etc.

The mediator 120 is a computer-based system including a data store 125 and mediates communication between the business applications 110A-110C and the collaboration application 130 to provide the collaboration services according to an aspect of the present invention. The data store 125 of the mediator 120 stores the context information and an ID representing the collaboration data. The mediator 120 uses this information stored in the data store 125 to generate the collaboration link and the collaboration history link according to an aspect of the invention.

The collaboration application 130 is a computer-based system providing various collaboration services. In an embodiment, the services correspond to at least some of those provided by the Oracle® Collaboration Suite 10g from Oracle Corporation of Redwood Shores, Calif. According to an embodiment of the present invention the collaboration application 130 provides information on a current or preferred mode of communication for one or more responders. The collaboration application 130 in turn may seek the services of a presence service or such to get the information on a current or preferred mode of communication for one or more responders, as is well known in the art.

Figure 2A:
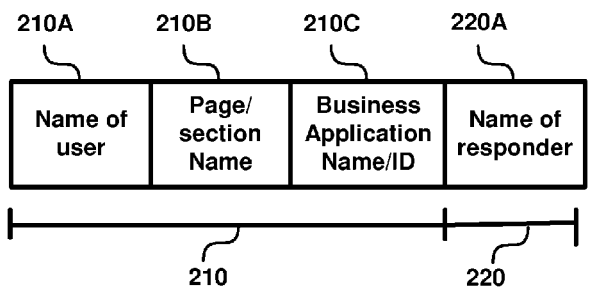
FIG. 2A illustrates the type of data carried in the context information according to an embodiment of the present invention and FIG. 2B illustrates an instance of the type of data carried in the context information according to an example embodiment of the present invention.

According to an embodiment of the present invention, a business application, for example, business application 110A generates context information for a user of the business application 110A as illustrated in FIG. 2A. The context information has two parts, a business application context 210 and a collaboration context 220, which are described below with examples.

The business application context 210 represents the actions (entry of data/inputs on forms/screens, etc.) performed by the user of the business application with respect to the business application or a section of the business application and/or the corresponding (internal) state of the business application generating the context information. Thus, the business application context may include the identifier of the user causing the context information to be sent, a page/section of the business application which caused the context information to be generated and sent, etc.

In the illustrative example, the business application context is shown containing user name 210A, page name/section name 210B, and business application name 210C. The page name/section name 210B is typically a page such as a web page the user has requested. Based on the business application context the business application 110A selects a predetermined responder, a person suitable for responding to the users queries.

The collaboration context 220 represents those parameters (e.g., user identifier) of a collaborator (a remote user party to the collaboration, or responder in this example) that are determined in the business application. Thus, the collaboration context includes information such as a predetermined responder selected for responding to the user of the business application and is shown by the name of the responder 220A in the embodiment of the invention. The business application 110A sends the context information illustrated in FIG. 2A to the mediator 120.

In an embodiment, the mediator 120 receives the context information illustrated in FIG. 2A from the business application 110A and stores the business application context 210 in its data store 125 as illustrated in FIG. 3A. The mediator 120 generates a query for the collaboration application 130 to get collaboration information on the responder indicated in the collaboration context 220. The mediator 120 stores this collaboration information in its data store 125 as illustrated in FIG. 3A, element 330D. Such collaboration information 330D includes the current or preferred mode of communication (such as email, voice, text messaging, paging, annotations in a document, pop-ups, a message in a Web page, or instant messaging, etc) for the name of the responder 220A in FIG. 2A.

In another embodiment, the mediator 120 generates a collaboration link, such as a hyperlink that opens and redirects the user to a communication client such as an email client or chat client, in order to facilitate communication with the responder 220A. The collaboration link is generated based on the information stored in the data store 125, such as the business application context 330A to 330C and the collaboration information 330D in FIG. 3A. The mediator 120 sends the collaboration link to the business application 110A that in turn incorporates this link on the current page/section of the business application i.e. the page name/section name 210B indicated in the business application context 210 in FIG. 2A. When the user of the business application 110A selects the collaboration link, control is redirected to the mediator 120 that opens a communication client as is indicated in the collaboration information 330D in FIG. 3A to initiate a collaboration session between the user and the responder.

In another embodiment, the mediator 120 adds itself as a participant in the collaboration session between the user and the responder to get the collaboration data and stores an ID corresponding to the collaboration data such as the IMAP URL ID in the data store 125 as illustrated in FIG. 3A, element 330E. When the mediator 120 receives the context information illustrated in FIG. 2A from the business application 110A, the mediator 120 searches its data store 125 for any prior entries on the context information and if there are any, the mediator 120 generates a collaboration history link, such as a hyperlink, which redirects the user to a web page including information on a history of prior collaboration sessions between the user and the responder indicated in the context information. The mediator 120 sends this collaboration history link to the business application 110A, which in turn incorporates it on the current page/section i.e. the page name/section name 210B indicated in the business application context 210.

3. EXAMPLE EMBODIMENT

FIGS. 4A to 4G are example snapshots of the web pages of the business application, for example, 110A, such as the Oracle® Internet Expenses application (hereafter referred to as Internet Expense application) from Oracle Corporation of Redwood Shores, Calif. and are only indicative of some of the operations of the application. A typical user of the Internet expense application such as John Doe is an employee filing for official expenses for reimbursement. Once the expenses are filed and submitted it reaches the employee's manager, Mary Beth in the example, who in turn approves/rejects the expenses. FIGS. 5 to 9 are flowcharts illustrating the various embodiments of the present invention and are described below with respect to the system in FIG. 1, FIGS. 2B and 3B and FIGS. 4A to 4G.

Figure 4B:
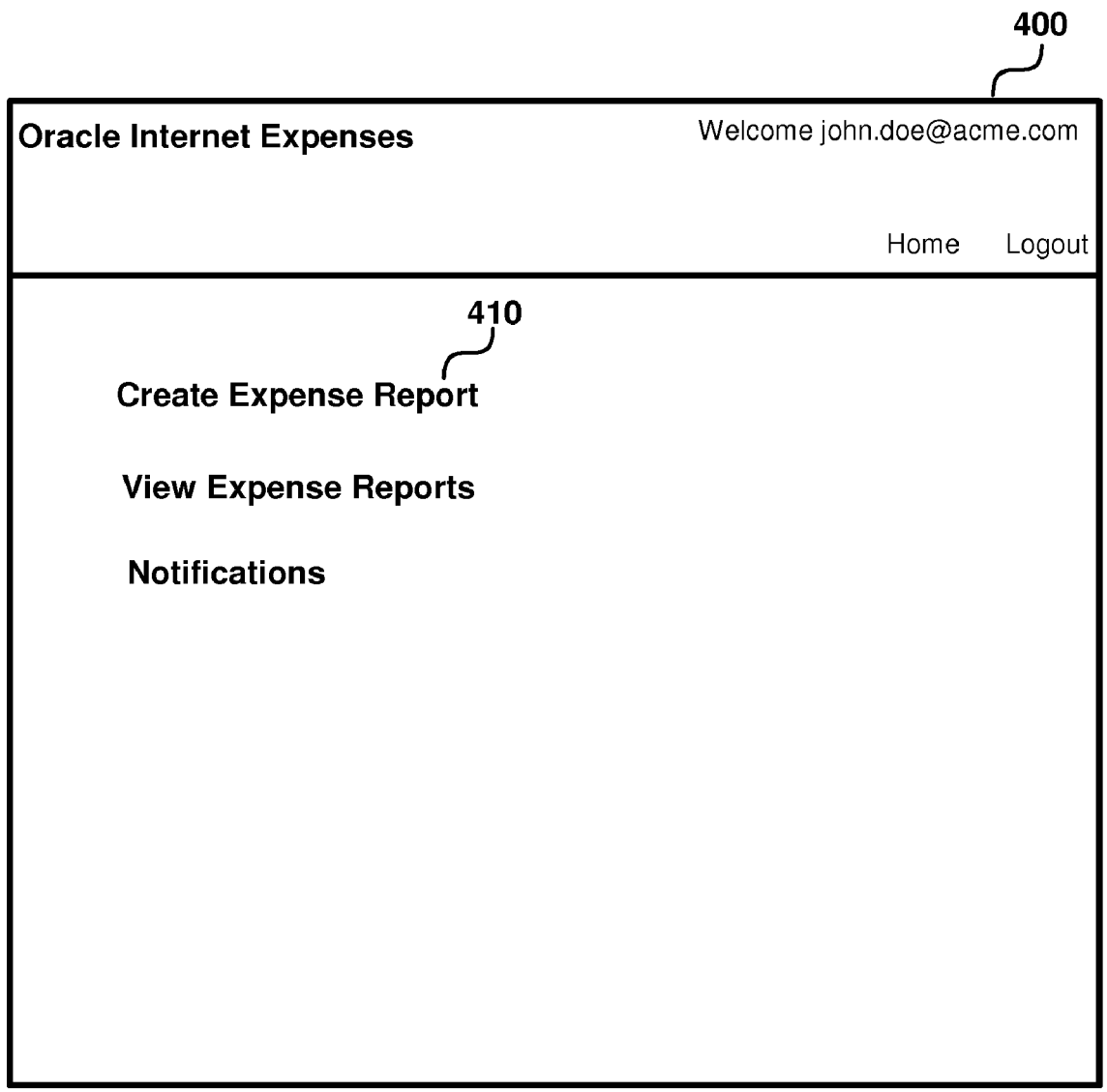
Figure 5:
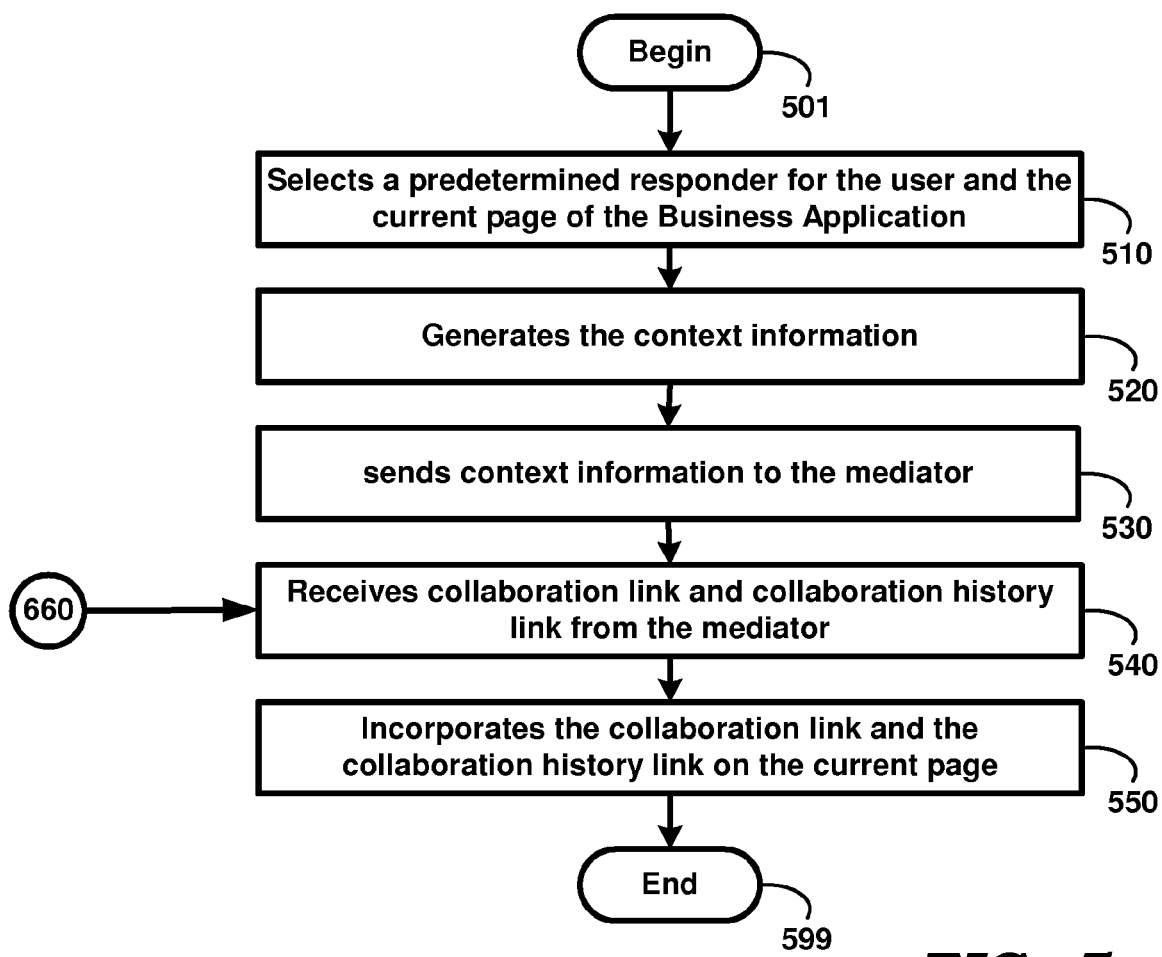
FIG. 5 is a flowchart illustrating the manner in which a business application functions to offer collaboration services to a user of the business application according to an aspect of the present invention.

FIG. 5 is a flowchart illustrating the manner in which the Internet Expense application (referred to as business application in the flowchart) operates to offer collaboration service to the user of the Internet Expense application. The flowchart begins in step 501; when the user logs in to the Internet Expense application as shown in FIG. 4A and accesses the first page of the application 400 shown in FIG. 4B and on this page selects the section titled create expense report 410. The control immediately passes on to step 510.

In step 510, the Internet Expense application selects a predetermined responder suitable for responding to any queries the user may have on the create expense report page. In the Internet Expense application example, the responder is the manager Mary Beth responsible for approving the user John Doe's expenses.

Figure 2B:
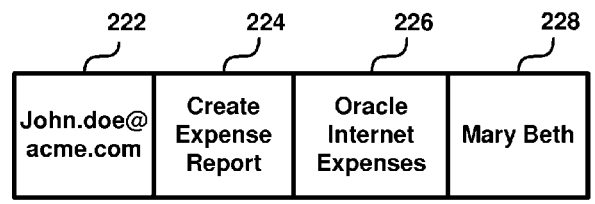

In step 520, the Internet Expense application generates the context information as illustrated in FIG. 2B, wherein, the business application context is represented by; john.doe@acme.com 222, create expense report 224, Oracle Internet Expense application 226 and the collaboration context is represented by Mary Beth 228. The Internet Expense application sends this context information to the mediator 120.

In step 530, the Internet Expense application sends this context information to the mediator 120.

In step 540, the Internet Expense application receives the collaboration link and the collaboration history link, if any, from the mediator 120.

Figure 4C:
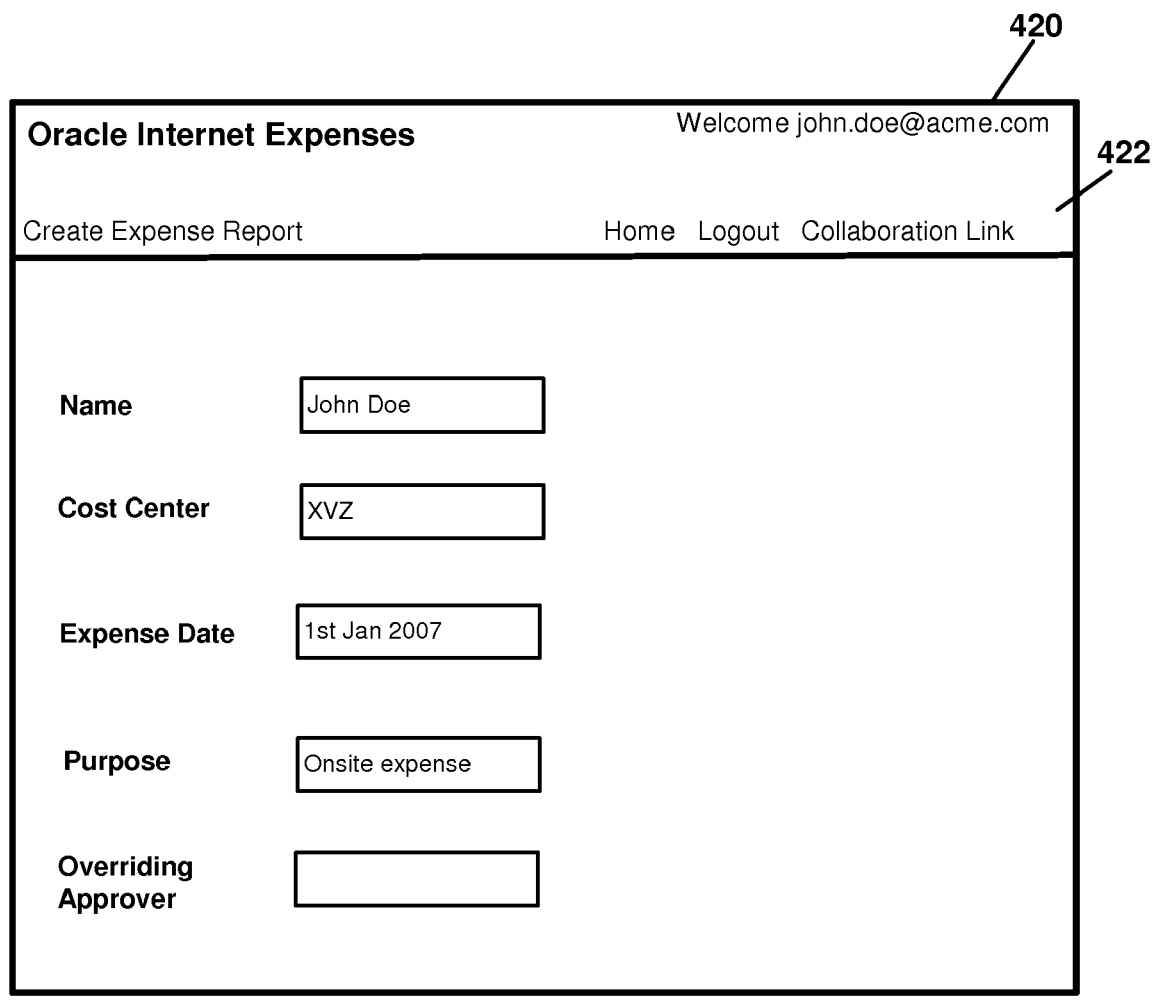
Figure 4D:
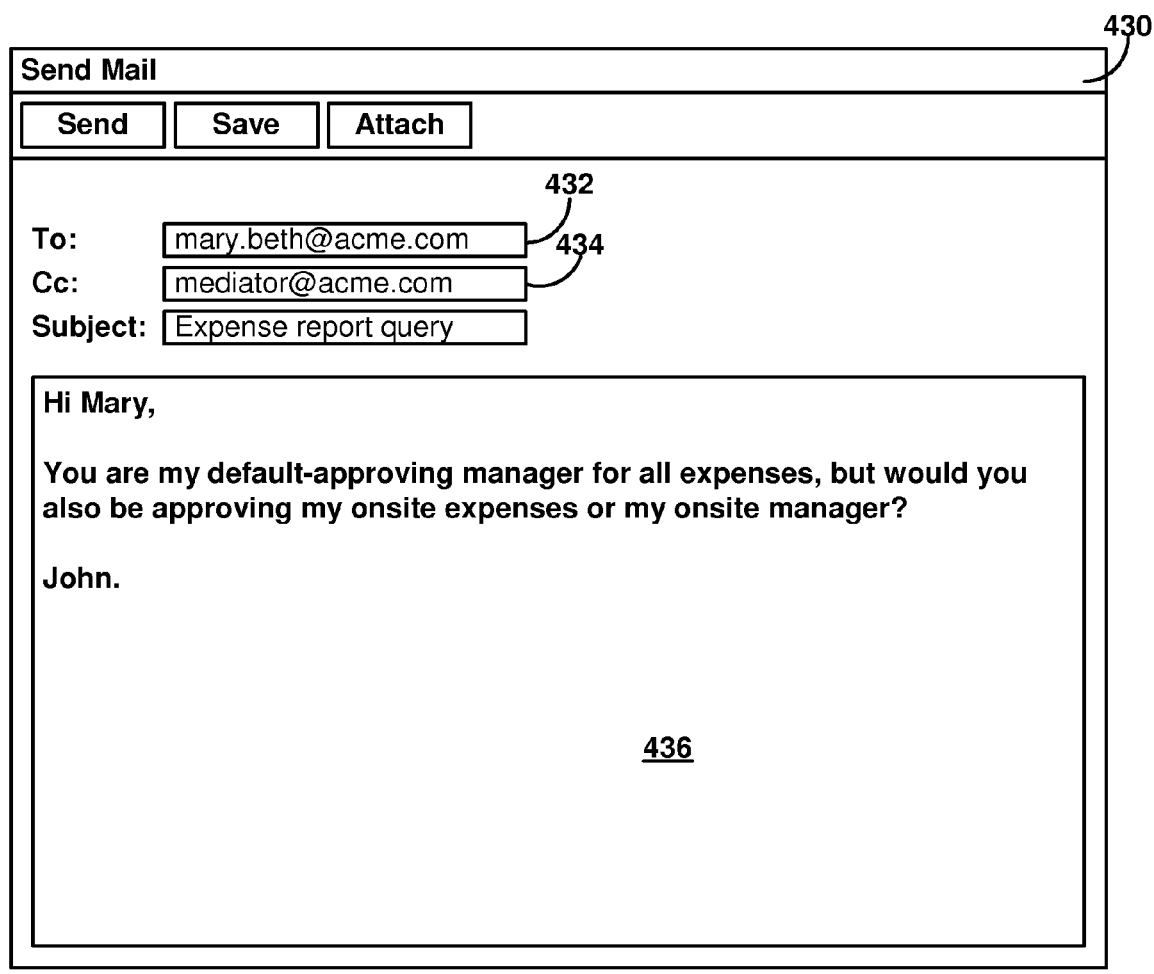
Figure 4E:
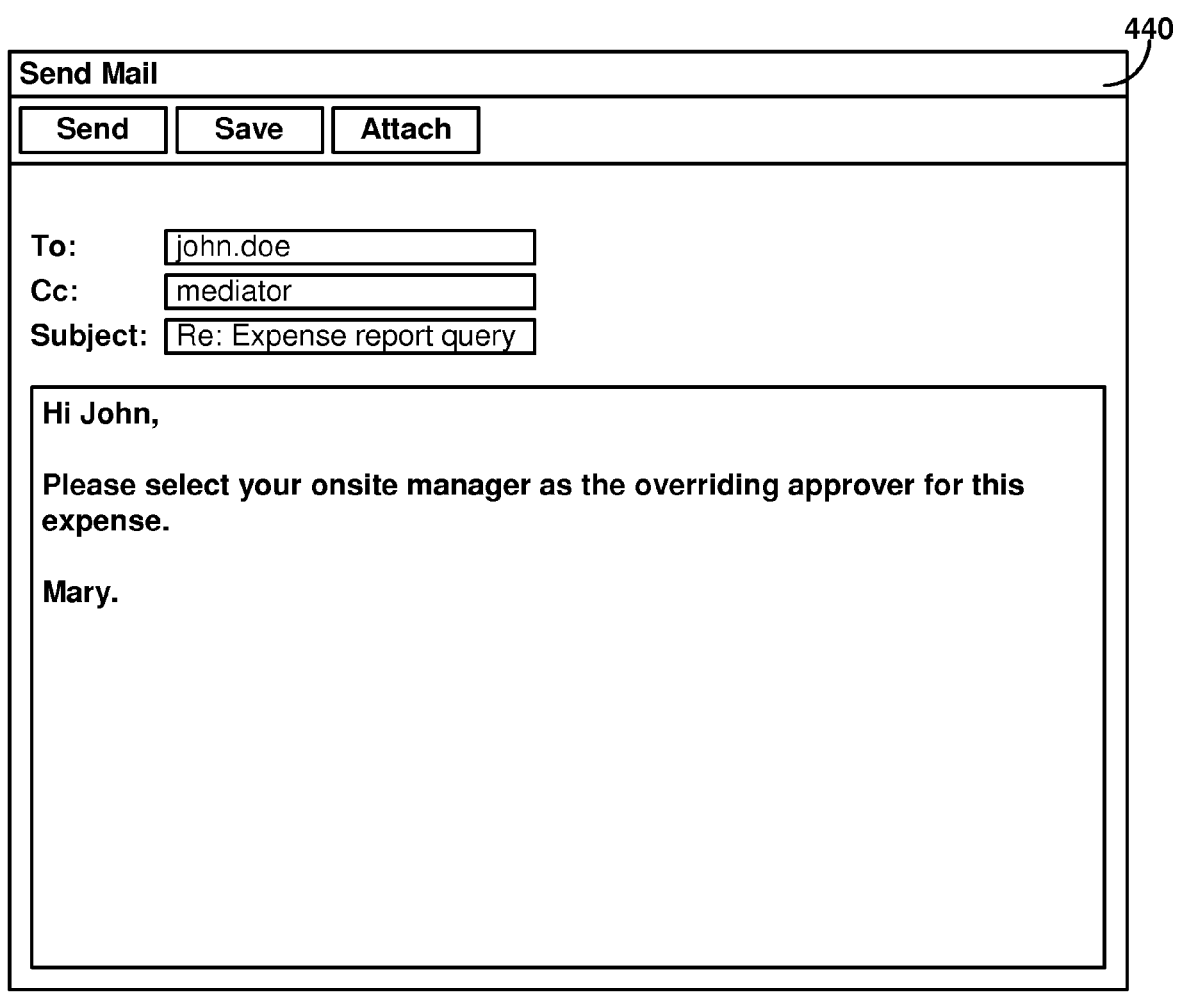
Figure 4F:
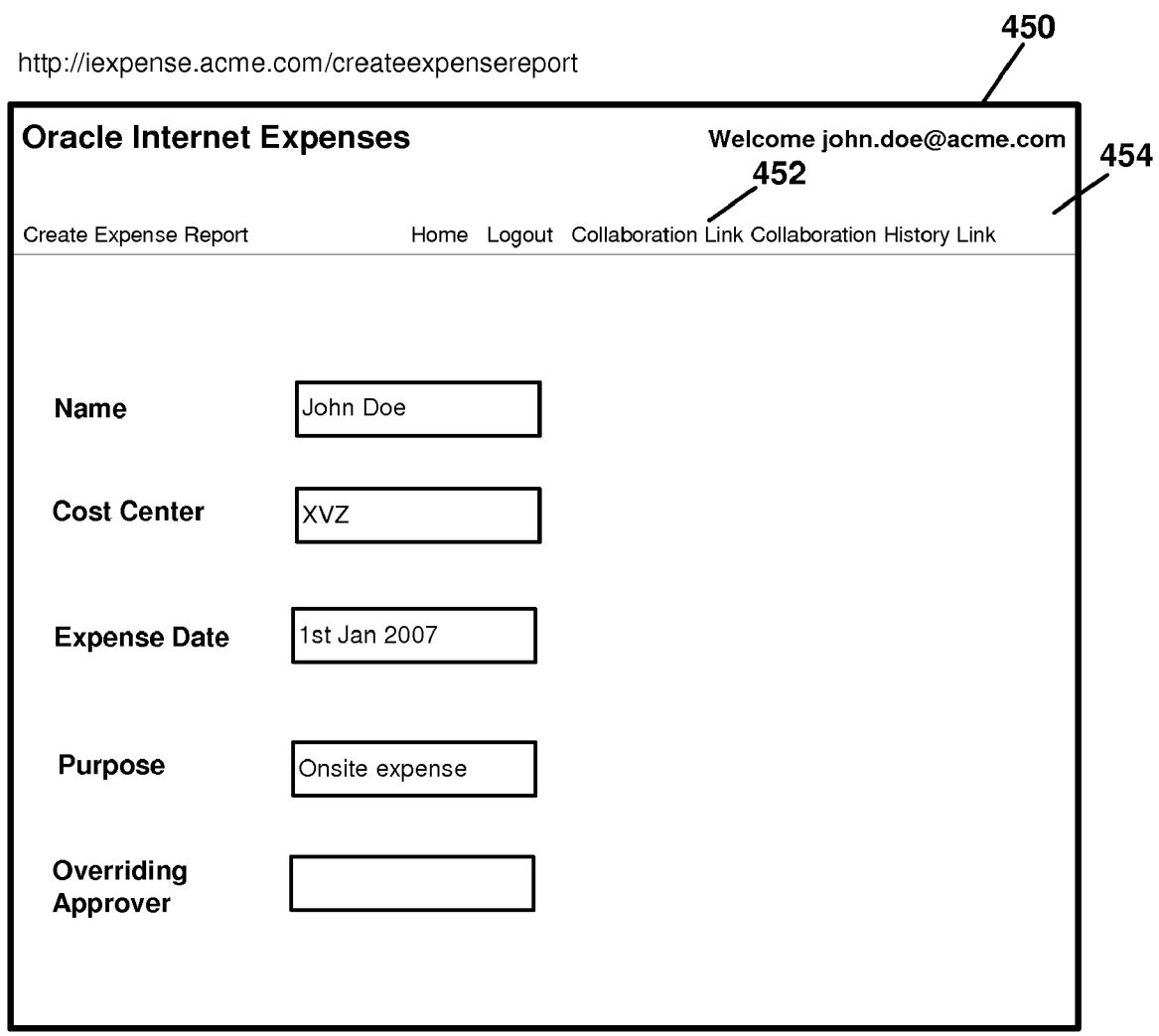

In step 550, the Internet Expense application incorporates the collaboration link 452 and the collaboration history link 454, if any, on the create expense report page 450 of the Internet Expense application as shown in FIG. 4F. If no collaboration history link is received from the mediator 120, create expense report page 420 as shown in FIG. 4C with only the collaboration link 422 is displayed.

The flowchart ends in step 599. The flowchart then repeats for each page that the user navigates to, displaying the collaboration link and collaboration history link, if any, for that page.

Figure 6:
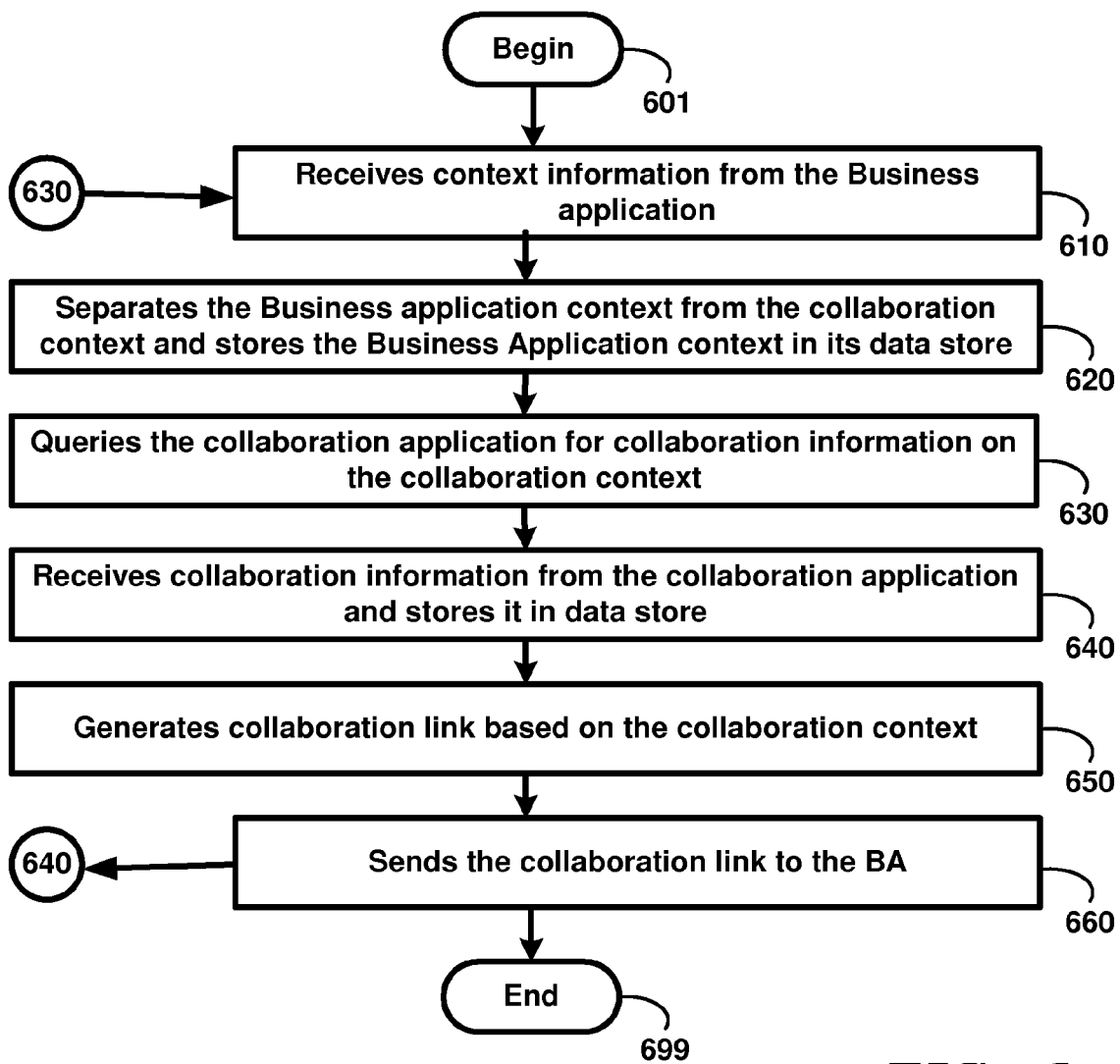
FIG. 6 is a flowchart illustrating the manner in which a mediator operates to generate the collaboration link according to an aspect of the present invention.

FIG. 6 is a flowchart illustrating the functions performed by the mediator 120 to generate the collaboration link for the Internet Expense application. The flowchart begins in step 601, and control immediately passes to step 610.

In step 610, the mediator 120 receives the context information in FIG. 2B from the Internet Expense application.

In step 620, the mediator 120 separates the business application context from the collaboration context and stores the business application context in its data store 125. The business application context as stored in the data store 125 is illustrated in FIG. 3B as john.doe@acme.com 342, create expense report 344, and Oracle Internet Expense application 345.

In step 630, the mediator 120 generates a query for the collaboration application 130 to get collaboration information on the collaboration context Mary Beth as indicated in FIG. 2B 228.

In step 640, the mediator 120 receives the collaboration information from the collaboration application 130, which in this example is mary.beth@acme.com 346. The mediator 120 stores this collaboration information 346 in its data store 125 as illustrated in FIG. 3B.

In step 650 the mediator 120 generates a collaboration link based on the collaboration information. A collaboration link for the example embodiment of the present invention is a hyperlink as shown below:

http://collabmed.acme.com/mediate.jspx?app=oracle-internet-expense&user=john.doe@acme.com&page=create-expense-report&responder=mary.beth@acme.com&collab=email, wherein;

app—represents the name or identity of the business application user—represents the name/contact address of the user of the Internet Expense application page—represents the current page/section of the Internet Expense application app&user&page—represent the business application context responder—represents the collaboration information i.e. the responder predetermined to respond to the user of the business application for the current page/section collab—represents the current or preferred mode of communication as indicated in the collaboration information In step 660 the mediator 120 sends the collaboration link to the Internet Expense application.

The flowchart ends in step 669.

Figure 7:
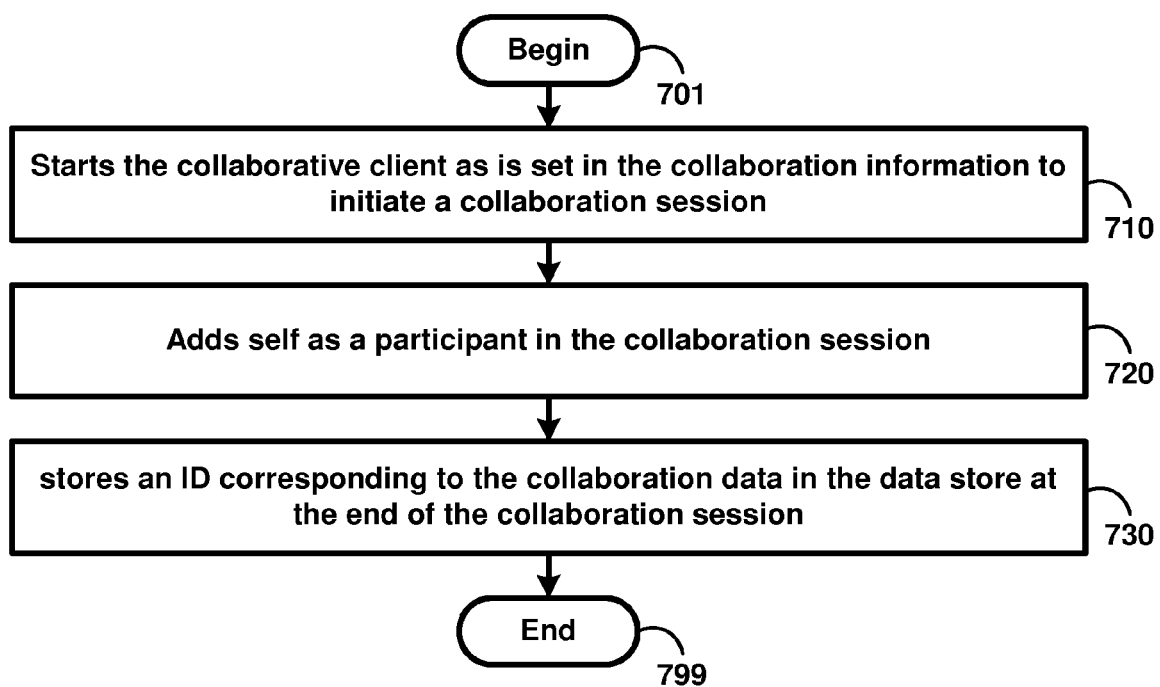
FIG. 7 is a flowchart illustrating the manner in which the mediator mediates communication between the user and responder of the business application according to an aspect of the present invention.

FIG. 7 is a flowchart, illustrating the manner in which the mediator 120 mediates communication between the user and the responder of the Internet Expense application. The flowchart begins in step 701 when the user selects the collaboration link 422 displayed on the create expense report page 420 of the Internet Expense application as in FIG. 4C and control passes to the mediator 120. The flowchart proceeds to step 710.

In step 710, the mediator 120 opens an email client as shown in FIG. 4D to initiate a collaboration session between the user and the responder.

In step 720, the mediator 120 completes the To address field (To: mary.beth@acme.com 432) and adds itself as a participant (cc: mediator@acme.com 434) in the collaboration session as shown in FIG. 4D. The user John Doe, types in a message 436 for his manager Mary Beth and sends the email message. The manager Mary Beth replies to the email message as shown in FIG. 4E including the mediator in the communication as cc: mediator@acme.com 444 and types in the message 446 and sends the email.

In step 730, the mediator 120 stores in its data store 125 shown in FIG. 3B an ID such as an IMAP URL (for example, 348 and 349) corresponding to the email messages 430 and 440 shown in FIGS. 4D and 4E respectively.

The flowchart ends in step 799.

Figure 8:
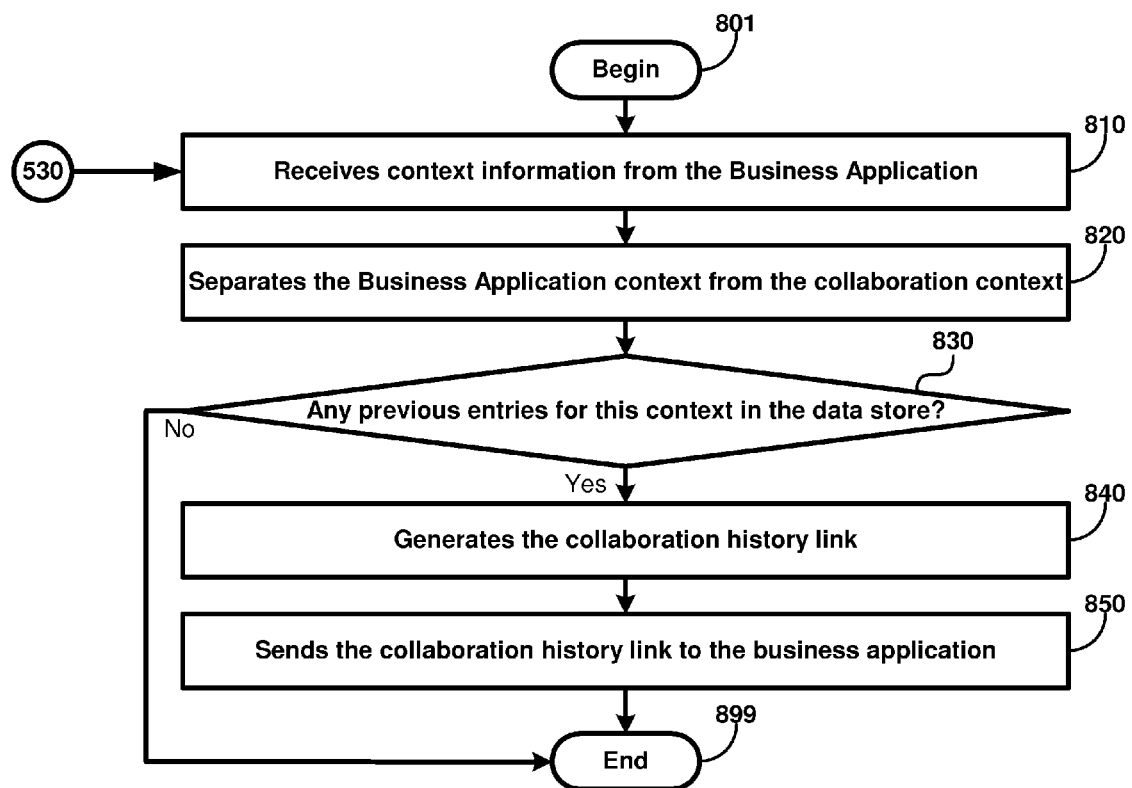
FIG. 8 is a flowchart illustrating the manner in which the mediator functions to generate the collaboration history link according to an aspect of the present invention.

FIG. 8 is a flowchart illustrating the manner in which the mediator 120 generates the collaboration history link. The flowchart begins in step 801, and control immediately passes to step 810.

In step 810, the mediator 120 receives the context information in FIG. 2B from the Internet Expense application.

In step 820, the mediator 120 separates the business application context from the collaboration context. The business application context as is illustrated in FIG. 2B as john.doe@acme.com 222, create expense report 224, and Oracle Internet Expense application 226.

In step 830, the mediator 120 searches in its data store 125 for any previous entries on the context information with respect to both the business application context and the collaboration context. If there are no entries in the data store 125, corresponding to a condition wherein, the user John Doe has never collaborated with his manager Mary Beth, no collaboration history link will be generated and the flowchart ends in step 899 otherwise the flowchart proceeds to step 840.

In step 840, the mediator 120 generates a collaboration history link, such as a hyperlink, that will redirect the user to a web page 460 as in FIG. 4G. FIG. 4G shows two links, link 1 462 and link 2 464 corresponding to two different entries in the data store 125. Selecting each link 462 or 464, will display at least part of the details of each of the past collaboration sessions as shown in the FIG. 4G below each link.

In step 850, the mediator 120 sends the collaboration history link to the Internet Expense application.

The flowchart ends in step 899.

Figure 9:
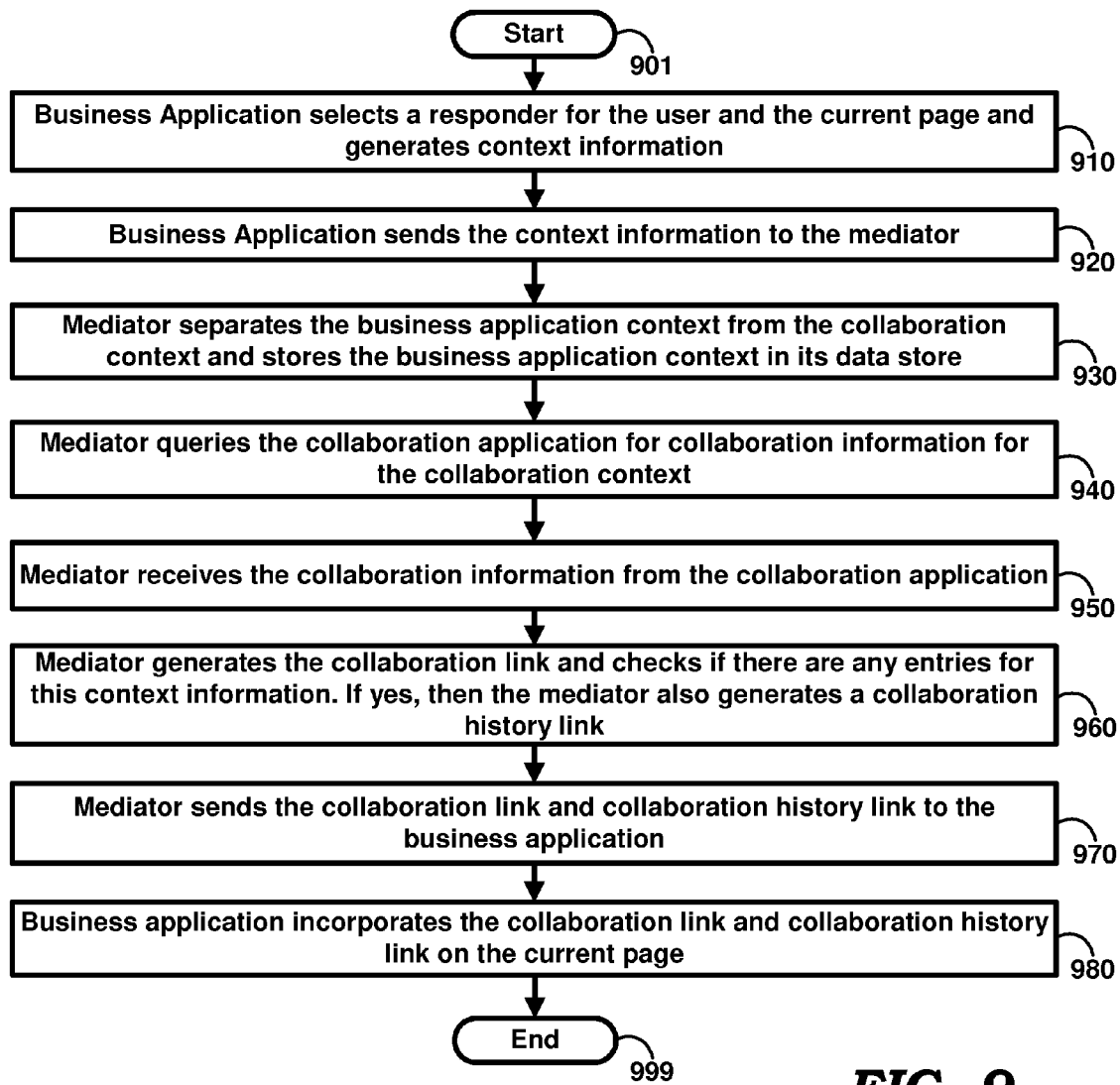
FIG. 9 is a flowchart illustrating the various steps performed by the components of the present invention to provide the collaboration services to a business application according various embodiments of the present invention.

FIG. 9 is a flowchart illustrating the various steps performed by the components of the present invention of system of FIG. 1 according to an aspect of the present invention. The flowchart begins in step 901; when the user logs in to the Internet Expense application as shown in FIG. 4A and accesses the first page of the application shown in FIG. 4B and on this page 400 selects the section titled create expense report 410. The control immediately passes on to step 910.

In step 910, the Internet Expense application selects a predetermined responder suitable for responding to any queries the user may have on the create expense report page 420 (FIG. 4C) and generates the context information as illustrated in FIG. 2B.

In step 920, the Internet Expense application sends this context information to the mediator 120.

In step 930, the mediator 120 separates the business application context from the collaboration context and stores the business application context in its data store 125.

In step 940, the mediator 120 queries the collaboration application 130 for collaboration information for the collaboration context.

In step 950, the mediator 120 receives the collaboration information from the collaboration application 130. The mediator 120 stores this collaboration information in its data store 125 as illustrated in FIG. 3B 346.

In step 960 the mediator 120 generates a collaboration link based on the collaboration information and also checks if there are any prior entries in the data store 125 corresponding to the context information. In case there are any prior entries on the corresponding context information, the mediator 120 also generates a collaboration history link.

In step 970, the mediator 120 sends the collaboration link and collaboration history link, if any, to the Internet Expense application.

In step 980, the Internet Expense application incorporates the collaboration link and collaboration history link, if any, on the current page/section of the application (for example, 452 and 454 of FIG. 4F).

The flowchart ends in step 999.

From the above, it may be appreciated that a mediator provides one or more links related to collaboration between a user of the business application and the collaborator (second user to the collaboration). Collaboration link, which simplifies the user to initiate communication with the collaborator using a collaboration client potentially of the collaborator's choice (based on determination using collaboration information, as described above), is an example of such a link. Collaboration history link, which facilitates the user to also view the history information of collaboration, is another example of the link. However, the link may lead to any other information related to collaboration in alternative embodiments.

While email is shown as the collaboration client in the examples described with the Figures/drawings, it should be appreciated that other collaboration clients (such as video conferencing, VoIP, etc.) can also be used (potentially as preferred by a user at that time of day, collaboration context, etc.) to facilitate collaboration.

It should be appreciated that the features described above can be implemented in a combination of one or more of hardware, software and firmware, as suited for the specific environment. The description is continued with respect to an embodiment in which the features are operative upon execution of appropriate software instructions.

4. DIGITAL PROCESSING SYSTEM

Figure 10:
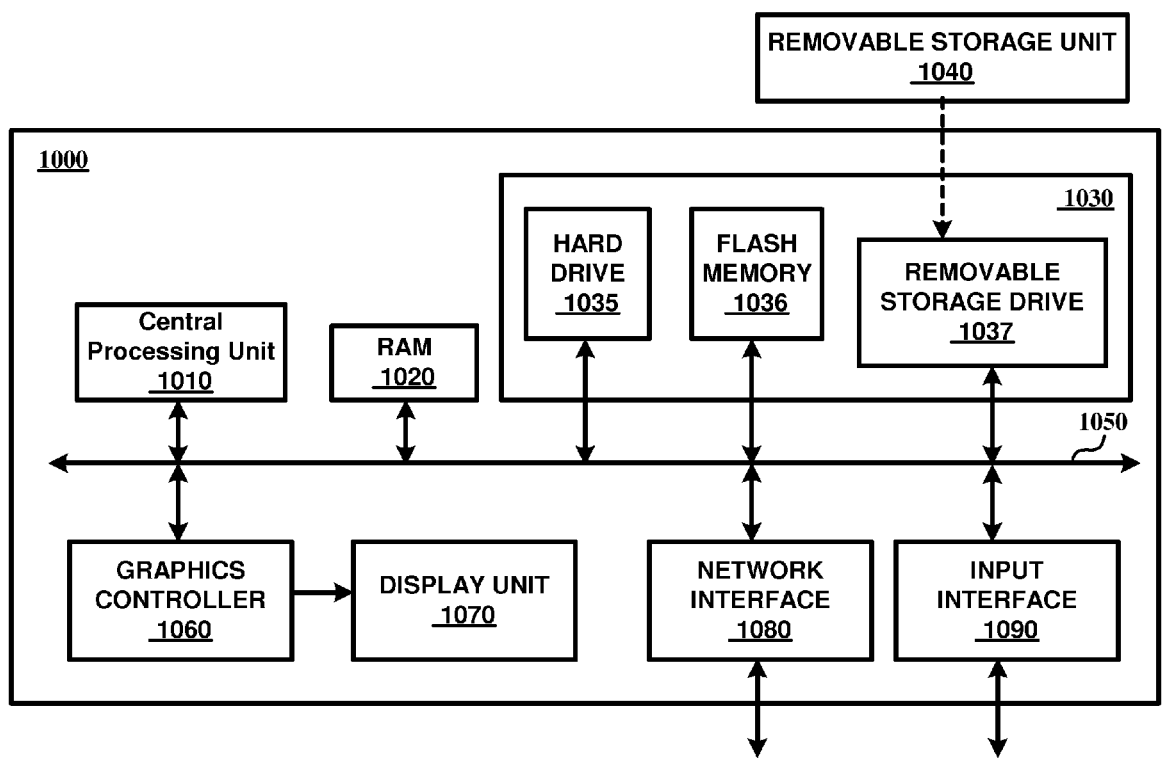
FIG. 10 is a block diagram illustrating the details of digital processing system in which several aspects of the present invention are operative by execution of appropriate software instructions.

FIG. 10 is a block diagram illustrating the details of digital processing system 1000 in which various aspects of the present invention are operative by execution of appropriate software instructions. Digital processing system 1000 may correspond to application servers 140 or server system 150 or application server 160 of FIG. 1. Digital processing system 1000 may contain one or more processors (such as a central processing unit (CPU) 1010), random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present invention. CPU 1010 may contain multiple processing units, with each processing unit potentially being designed for a specific task. Alternatively, CPU 1010 may contain only a single general purpose-processing unit. RAM 1020 may receive instructions from secondary memory 1030 using communication path 1050

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a keyboard and a pointing device (e.g., touch-pad, mouse). Network interface 1080 provides connectivity to a network (e.g., using Internet Protocol), and may be used to communicate with others connected systems of FIG. 1.

Secondary memory 1030 may contain hard drive 1035, flash memory 1036, and removable storage drive 1037. Secondary memory 1030 may store the data (e.g., data depicted in FIG. 2A and portions of data depicted in FIG. 3A) and software instructions (e.g., implementing the flowcharts of FIGS. 5 to 8), which enable system 1000 to provide several features in accordance with the present invention. Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable storage medium having stored therein computer software and/or data. However, the computer (or in general, machine) readable storage medium can be in other forms (e.g., non-removable, random access, etc.).

Further, even though the machine-readable medium is shown as being contained within system 1000, it should be appreciated that the medium can be provided external to system 1000. In such a case, the instructions may be received, for example, on a network. In addition, some of the aspects can be implemented on a cooperating set of computer systems, even though the system 1000 is shown as a single system. The software instructions may accordingly be adapted for such distributed processing.

In this document, the term "computer program product" is used to generally refer to removable storage unit 1040 or hard disk installed in hard drive 1035. These computer program products are means for providing software to system 1000. CPU 1010 may retrieve the software instructions, and execute the instructions to provide various features of the present invention described above.

5. CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. An apparatus for mediating between a business application and a collaboration application to provide collaboration service to the business application, the business application executing on one or more application servers, the apparatus comprising:

a processor and a memory for storing instructions executable by the processor, the processor capable of:

receiving from the business application a context information identifying a section of the business application requested by a first user and identifying a second user associated with the section of the business application, wherein the context information is generated in response to the first user requesting the section of the business application;

receiving from the collaboration application, information on a mode of communication with the second user;

storing in a first entry in a data store, the context information and the information on the mode of communication with the second user;

searching from a plurality of entries in the data store, for a second entry storing information matching the context information received from the business application, wherein each entry of the plurality of entries stores information associated with historical communication between users of the business application;

in response to the searching, generating one or more links, the one or more links comprising a first link generated based on the first entry and a second link generated based on the second entry, wherein the second link is generated only if the second entry is determined by the searching, and wherein the first link when selected is designed to open a communication session between the first user and the second user and the second link when selected is designed to open historical communication between the first user and the second user;

sending the one or more links to the business application for including on a display associated with the section of the business application requested by the first user;

receiving an indication of completion of the communication session between the first user and the second user; and in response to receiving said indication of completion of the communication session between the first user and the second user, the communication session facilitated by selection of the first link of the one or more links, updating the first entry with an identifier corresponding to the communication session.

2. The apparatus of claim 1 wherein the the processor is further capable of receiving an identity of the business application along with the context information from the business application.

3. The apparatus of claim 1 wherein, the first link on the display associated with the section of the business application comprises a hyperlink, wherein the hyperlink when selected by the first user redirects the first user to the apparatus, and wherein the apparatus is capable of opening a communication client with a communication address of the second user determined from the information on the mode of communication with the second user.

4. The apparatus of claim 3 wherein the communication client also includes a communication address associated with the apparatus thereby enabling the receiving by the apparatus, the indication of completion of the communication session between the first user and the second user.

5. The apparatus of claim 1 wherein, the second link comprises a hyperlink which when selected redirects the first user to a web page that comprises the historical communication between the first user and the second user.

6. The apparatus of claim 5 wherein the historical communication between the first user and the second user includes previously exchanged one or more messages between the first user and the second user wherein each of the one or more messages is associated with one of email, chat, or voice.

7. The apparatus of claim 1 wherein the second user is a predefined responder for the first user in association with the section of the business application.

8. The apparatus of claim 1 further capable of:
receiving from the business application a second context information identifying the section of the business application requested by a third user and identifying a fourth user associated with the section of the business application, wherein the second context information is generated in response to the third user requesting the section of the business application;

receiving from the collaboration application information on a mode of communication with the fourth user;

generating at least a third link based on the second context information and based on the information on the mode of communication with the third user, wherein the third link when selected by the third user is designed to open a communication session between the third user and the fourth user; and sending the third link to the business application for including on a display associated with the section of the business application requested by the third user.

9. The apparatus of claim 1 wherein the collaboration information includes a communication address of the second user for communicating with the second user using a communication mode from one or more of email, voice, chat or messaging.

10. The apparatus of claim 9 wherein, the communication session comprises an email communication and the identifier corresponding to the communication session is an IMAP URL for the email communication.

11. A method for mediating between a business application and a collaboration application to provide collaboration service to the business application, the business application executing on one or more application servers, the method being performed by a processor in association with a memory storing instructions executable by the processor, the method comprising:

receiving from the business application a context information identifying a section of the business application requested by a first user and identifying a second user associated with the section of the business application, wherein the context information is generated in response to the first user requesting the section of the business application;

receiving from the collaboration application, information on a mode of communication with the second user;

storing in a first entry in a data store, the context information and the information on the mode of communication with the second user;

searching from a plurality of entries in the data store, a second entry storing information matching the context information received from the business application wherein each entry of the plurality of entries stores information associated with historical communication between users of the business application;

in response to the searching generating one or more links the one or more links comprising a first link generated based on the first entry and a second link generated based on the second entry, wherein the second link is generated only if the second entry is determined by the searching, and wherein the first link when selected is designed to open a communication session between the first user and the second user and the second link when selected is designed to open historical communication between the first user and the second user;

sending the one or more links to the business application for including on a display associated with the section of the business application requested by the first user;

receiving an indication of completion of the communication session between the first user and the second user; and in response to receiving said indication of completion of the communication session between the first user and the second user, the communication session facilitated by selection of the first link of the one or more links, updating the first entry with an identifier corresponding to the communication session.

12. The method of claim 11 wherein, the receiving the context information further receives an identifier for the first user and an identifier for the business application.

13. The method of claim 11 wherein, the first link on the display associated with the section of the business application comprises a hyperlink, wherein the hyperlink when selected by the first user redirects the first user to the apparatus, and wherein the apparatus is capable of opening a communication client with a communication address of the second user determined from the information on the mode of communication with the second user.

14. The method of claim 13 wherein the communication client also includes a communication address associated with the apparatus thereby enabling the receiving by the apparatus, the indication of completion of the communication session between the first user and the second user.

15. The method of claim 11 wherein, the second link comprises a hyperlink which when selected redirects the first user to a web page that comprises the historical communication between the first user and the second user.

16. The method of claim 15 wherein the historical communication between the first user and the second user includes previously exchanged one or more messages between the first user and the second user wherein each of the one or more messages is associated with one of email, chat, or voice.

17. The method of claim 11 wherein the second user is a predefined responder for the first user in association with the section of the business application.

18. The method of claim 11 further comprising:
receiving from the business application a second context information identifying the section of the business application requested by a third user and identifying a fourth user associated with the section of the business application, wherein the second context information is generated in response to the third user requesting the section of the business application;
receiving from the collaboration application information on a mode of communication with the fourth user;
generating at least a third link based on the second context information and based on the information on the mode of communication with the third user, wherein the third link when selected by the third user is designed to open a communication session between the third user and the fourth user; and
sending the third link to the business application for including on a display associated with the section of the business application requested by the third user.

19. The method of claim 11 wherein the collaboration information includes a communication address of the second user for communicating with the second user using a communication mode from one or more of email, voice, chat or messaging.

20. The method of claim 11 wherein, the communication session comprises an email communication and the identifier corresponding to the communication session is an IMAP URL for the email communication.

21. A non-transitory machine-readable storage medium storing a plurality of instructions executable by a processor for mediating between a business application and a collaboration application to provide collaboration service to the business application, the business application executing on one or more application servers, wherein execution of the plurality of instructions by the processor causes the processor to perform the actions of:
receiving from the business application a context information identifying a section of the business application requested by a first user and identifying a second user associated with the section of the business application, wherein the context information is generated in response to the first user requesting the section of the business application;
receiving from the collaboration application, information on a mode of communication with the second user;
storing in a first entry in a data store, the context information and the information on the mode of communication with the second user;
searching from a plurality of entries in the data store, a second entry storing information matching the context information received from the business application wherein each entry of the plurality of entries stores information associated with historical communication between users of the business application;
in response to the searching generating one or more links the one or more links comprising a first link generated based on the first entry and a second link generated based on the second entry,
wherein the second link is generated only if the second entry is determined by the searching, and
wherein the first link when selected is designed to open a communication session between the first user and the second user and the second link when selected is designed to open historical communication between the first user and the second user;
sending the one or more links to the business application for including on a display associated with the section of the business application requested by the first user;
receiving an indication of completion of the communication session between the first user and the second user; and
in response to receiving said indication of completion of the communication session between the first user and the second user, the communication session facilitated by selection of the first link of the one or more links, updating the first entry with an identifier corresponding to the communication session.

22. The non-transitory machine-readable storage medium of claim 21 wherein, the receiving the context information from the business application further receives an identifier for the first user and an identifier for the business application.

23. The non-transitory machine-readable storage medium of claim 21 wherein, the first link on the display associated with the section of the business application comprises a hyperlink,
wherein the hyperlink when selected by the first user redirects the first user to the apparatus, and wherein the apparatus is capable of opening a communication client with a communication address of the second user determined from the information on the mode of communication with the second user.

24. The non-transitory machine-readable storage medium of claim 23 wherein the communication client also includes a communication address associated with the apparatus thereby enabling the receiving by the apparatus, the indication of completion of the communication session between the first user and the second user.

25. The non-transitory machine-readable storage medium of claim 21 wherein, the second link comprises a hyperlink which when selected redirects the first user to a web page that comprises the historical communication between the first user and the second user.

26. The non-transitory machine-readable storage medium of claim 25 wherein the historical communication between the first user and the second user includes previously exchanged one or more messages between the first user and the second user wherein each of the one or more messages is associated with one of email, chat, or voice.

27. The non-transitory machine-readable storage medium of claim 21 wherein the second user is a predefined responder for the first user in association with the section of the business application.

28. The non-transitory machine-readable storage medium of claim 21 wherein the plurality of instructions further causes the processor to perform the actions of:
  receiving from the business application a second context information identifying the section of the business application requested by a third user and identifying a fourth user associated with the section of the business application, wherein the second context information is generated in response to the third user requesting the section of the business application;
  receiving from the collaboration application information on a mode of communication with the fourth user;
  generating at least a third link based on the second context information and based on the information on the mode of communication with the third user, wherein the third link when selected by the third user is designed to open a communication session between the third user and the fourth user; and
  sending the third link to the business application for including on a display associated with the section of the business application requested by the third user.

29. The non-transitory machine-readable storage medium of claim 21 wherein the collaboration information includes a communication address of the second user for communicating with the second user using a communication mode from one or more of email, voice, chat or messaging.

30. The non-transitory machine-readable storage medium of claim 29 wherein, the communication session comprises an email communication and the identifier corresponding to the communication session is an IMAP URL for the email communication.

* * * * *

UNITED STATES PATENT AND TRADEMARK OFFICE
CERTIFICATE OF CORRECTION

| | | |
|---|---|---|
| PATENT NO. | : 7,996,237 B2 | Page 1 of 1 |
| APPLICATION NO. | : 11/772254 | |
| DATED | : August 9, 2011 | |
| INVENTOR(S) | : Vedula | |

It is certified that error appears in the above-identified patent and that said Letters Patent is hereby corrected as shown below:

In column 3, line 53, delete "application" and insert -- application. --, therefor.

In column 9, line 60, delete "1050" and insert -- 1050. --, therefor.

In column 11, line 35, in Claim 2, delete "the the" and insert -- the --, therefor.

In column 12, line 51, in Claim 11, delete "searching" and insert -- searching, --, therefor.

In column 12, line 51, in Claim 11, delete "links" and insert -- links, --, therefor.

In column 14, line 23, in Claim 21, delete "searching" and insert -- searching, --, therefor.

In column 14, line 23, in Claim 21, delete "links" and insert -- links, --, therefor.

Signed and Sealed this
Fifteenth Day of November, 2011

David J. Kappos
*Director of the United States Patent and Trademark Office*